(12) United States Patent
Suteerawanit

(10) Patent No.: US 10,561,139 B1
(45) Date of Patent: Feb. 18, 2020

(54) ANTI-CONTAMINATION RODENT BAIT STATION

(71) Applicant: Nick Suteerawanit, Los Angeles, CA (US)

(72) Inventor: Nick Suteerawanit, Los Angeles, CA (US)

(*) Notice: Subject to any disclaimer, the term of this patent is extended or adjusted under 35 U.S.C. 154(b) by 0 days.

(21) Appl. No.: 16/374,957

(22) Filed: Apr. 4, 2019

(51) Int. Cl.
*A01M 25/00* (2006.01)

(52) U.S. Cl.
CPC ....... *A01M 25/004* (2013.01); *A01M 2200/01* (2013.01)

(58) Field of Classification Search
CPC .. A01M 25/004; A01M 25/002; A01M 1/223; A01M 2200/01
USPC .......................................... 43/131
See application file for complete search history.

(56) References Cited

U.S. PATENT DOCUMENTS

| | | | |
|---|---|---|---|
| 2,587,397 A | 2/1952 | Smith | |
| 2,588,894 A * | 3/1952 | Taff | A01M 1/223 43/112 |
| 3,225,485 A * | 12/1965 | Powell | A01M 23/00 43/131 |
| 3,603,022 A * | 9/1971 | Asher | A01M 1/24 43/131 |
| 4,186,512 A * | 2/1980 | Berg | A01M 1/223 43/112 |
| 4,281,471 A | 8/1981 | Jenkins | |
| 4,349,981 A | 9/1982 | Sherman | |
| 4,400,904 A * | 8/1983 | Baker | A01M 25/004 119/52.4 |
| 4,839,984 A * | 6/1989 | Saunders | A01M 1/223 43/112 |
| 4,869,015 A * | 9/1989 | Murakami | A01M 1/223 43/98 |
| 5,027,548 A | 7/1991 | Anderson | |
| 5,301,458 A * | 4/1994 | Deyoreo | A01M 1/04 43/112 |
| 5,435,096 A * | 7/1995 | Nekomoto | A01M 1/223 43/112 |
| 6,588,141 B1 | 7/2003 | Bergeson | |
| 7,310,907 B2 | 12/2007 | Suteerawanit | |
| 8,028,468 B1 | 10/2011 | Walsh | |

(Continued)

FOREIGN PATENT DOCUMENTS

| | | | | |
|---|---|---|---|---|
| CA | 2825880 A1 * | 8/2012 | .......... | A01M 25/004 |
| CA | 2931235 A1 * | 5/2015 | .......... | A01M 25/004 |

(Continued)

*Primary Examiner* — Magdalena Topolski
*Assistant Examiner* — Morgan T Barlow
(74) *Attorney, Agent, or Firm* — Kenneth L. Green; Averill & Green

(57) ABSTRACT

An anti-contamination bait station includes a housing, rodent entrances into the housing, a removable or opening, lockable housing front, contamination guards above the rodent entrances, poison holders inside the housing, a removable tray, and powder insecticide slots at each end of the housing below the rodent entrances. A bottom portion of the housing provides space for common bricks arranged end to end. A center portion of the housing provides space for the removable tray. A top portion of the housing provides space for rodent poison blocks. The tray includes insecticide troughs art each end aligned with the insect slots and containing insecticide.

18 Claims, 3 Drawing Sheets

(56) References Cited

U.S. PATENT DOCUMENTS

| | | | | |
|---|---|---|---|---|
| 8,578,649 B1* | 11/2013 | Walsh | | A01M 25/004 |
| | | | | 220/603 |
| 8,621,777 B2 | 1/2014 | Rivera | | |
| 8,701,337 B2* | 4/2014 | Kay | | A01M 25/004 |
| | | | | 206/818 |
| 8,720,107 B1* | 5/2014 | Vickery | | A01M 1/106 |
| | | | | 43/107 |
| 8,793,929 B1 | 8/2014 | Walsh | | |
| 8,984,802 B1* | 3/2015 | Walsh | | A01M 25/004 |
| | | | | 43/131 |
| 9,220,256 B2* | 12/2015 | Walsh | | A01M 23/30 |
| 9,258,991 B2* | 2/2016 | Harper | | A01M 25/004 |
| 9,532,564 B1* | 1/2017 | Walsh | | A01M 25/004 |
| 2002/0043018 A1* | 4/2002 | Townsend | | A01M 23/16 |
| | | | | 43/131 |
| 2007/0151142 A1* | 7/2007 | Suteerawanit | | A01M 1/106 |
| | | | | 43/122 |
| 2008/0072475 A1* | 3/2008 | Nelson | | A01M 25/004 |
| | | | | 43/131 |
| 2009/0077861 A1* | 3/2009 | Stephens | | A01M 25/004 |
| | | | | 43/131 |
| 2009/0229170 A1* | 9/2009 | Gaibotti | | A01M 25/004 |
| | | | | 43/131 |
| 2012/0204476 A1* | 8/2012 | Frisch | | A01M 1/023 |
| | | | | 43/114 |
| 2014/0283435 A1* | 9/2014 | Galeb | | A01M 23/005 |
| | | | | 43/107 |
| 2015/0257378 A1* | 9/2015 | Zhang | | A01M 1/2011 |
| | | | | 43/112 |
| 2015/0366210 A1* | 12/2015 | Olson | | A01M 1/026 |
| | | | | 43/112 |
| 2017/0079260 A1* | 3/2017 | Hays | | A01M 31/002 |
| 2018/0116202 A1* | 5/2018 | Burger | | A01M 25/004 |
| 2019/0037829 A1* | 2/2019 | Laut | | A01M 31/002 |
| 2019/0124913 A1* | 5/2019 | Power | | A01M 31/002 |
| 2019/0183126 A1* | 6/2019 | Gries | | A01N 45/00 |

FOREIGN PATENT DOCUMENTS

| | | | | |
|---|---|---|---|---|
| DE | 2448140 A1 * | 4/1976 | | A01M 1/06 |
| DE | 19544117 A1 * | 5/1997 | | A01M 1/2011 |
| EP | 3456198 A2 * | 3/2019 | | A01M 23/24 |
| FR | 449427 A * | 2/1913 | | A01M 1/223 |
| WO | WO-2012120263 A1 * | 9/2012 | | A01M 25/004 |

* cited by examiner

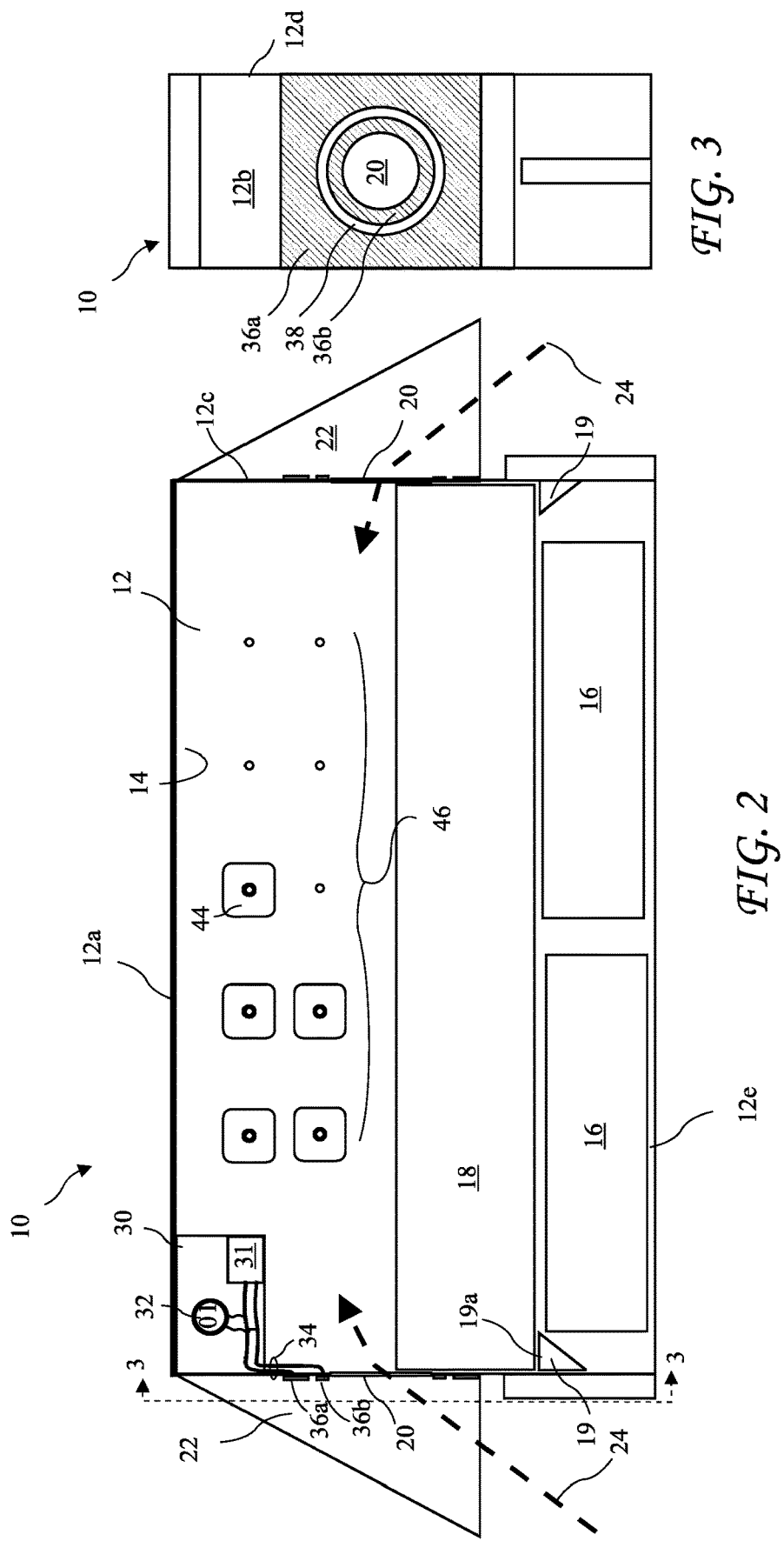

ANTI-CONTAMINATION RODENT BAIT STATION

BACKGROUND OF THE INVENTION

The present invention relates to pest extermination and in particular to a bait station containing rodent poison.

Rodents damage and remain a health hazard for both commercial and residential locations. Bait stations used to eliminate rodents commonly contain rodent poison blocks. The rodent poison blocks combine a rodent poison with an attracting material resulting in the rodent eating the poison.

The bait stations are utilized in areas open to humans and animals to avoid unintentional harm. The rodent poison blocks are isolated inside from human or animal contact inside the bait station. Unfortunately, known bait stations have a number of weaknesses. Various creatures such as slugs, snails, crickets, etc. are able to enter the bait station easily, eat and contaminate the poison. Then rodent will not eat the baits any more. Water may enter the bait station and damage the structure or poison. Ambient heat may also spoil the poison. Leaves and dust make the bait dirty, no longer attractive to rodent. As a result, a need remains for an improved bait station.

BRIEF SUMMARY OF THE INVENTION

The present invention addresses the above and other needs by providing an anti-contamination bait station including a housing, rodent entrances into the housing, a removable or opening, lockable housing front, contamination guards above the rodent entrances, poison holders inside the housing, a removable tray, and insecticide slots at each end of the housing below the rodent entrances. A bottom portion of the housing provides space for common bricks arranged end to end. A center portion of the housing provides space for the removable tray. A top portion of the housing provides space for rodent poison blocks. The tray includes insecticide troughs at each end aligned with the insect slots and containing powdered insecticide.

In accordance with one aspect of the invention, there is provided a bait station having a removable tray. The tray residing in the center portion supported by tray supports, the tray removable and simultaneously touching opposite interior ends of the housing, the tray including vertical tray end walls at ends of the tray and diagonal interior walls proximal to the tray end wall providing insecticide troughs between the tray end walls and the diagonal interior walls and accessible through the insect openings in ends of the bait station. The tray is preferably white to allow easy identification of rodent droppings.

In accordance with another aspect of the invention, there is provided a bait station having contamination guards residing over the rodent entrances. The contamination guards reaching down and out from a top edge of the housing above the rodent entrances, and reach down below the rodent entrances In accordance with another aspect of the invention, there is provided a bait station having a circuit including a 9 volts battery and a LED momentary rocker switch, which is used as a checker for battery power status. Two spaced apart portions of electrically copper foil reside around the rodent entrance and are electrically connected to the circuit to resist entry of slugs and snails through the rodent entrances.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 2 is a cross-sectional view of the bait station according to the present invention taken along line 2-2 of FIG. 1B.

FIG. 3 is a cross-sectional view of the bait station according to the present invention taken along line 3-3 of FIG. 2.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Where the terms "about" or "generally" are associated with an element of the invention, it is intended to describe a feature's appearance to the human eye or human perception, and not a precise measurement.

Figure 1B:
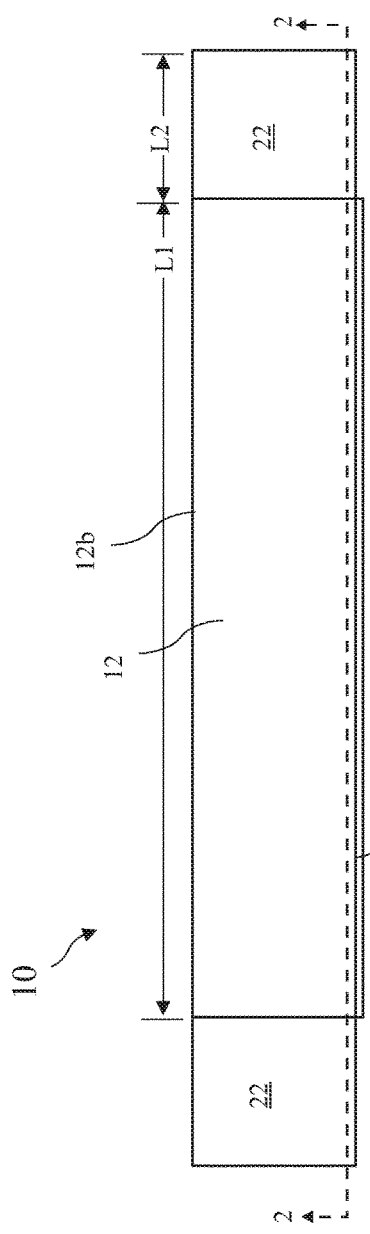
FIG. 1B is a top view of the bait station according to the present invention.
Figure 1C:
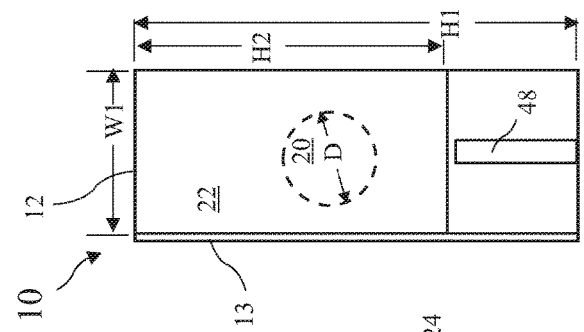
FIG. 1C is a side view of the bait station according to the present invention.
Figure 1A:
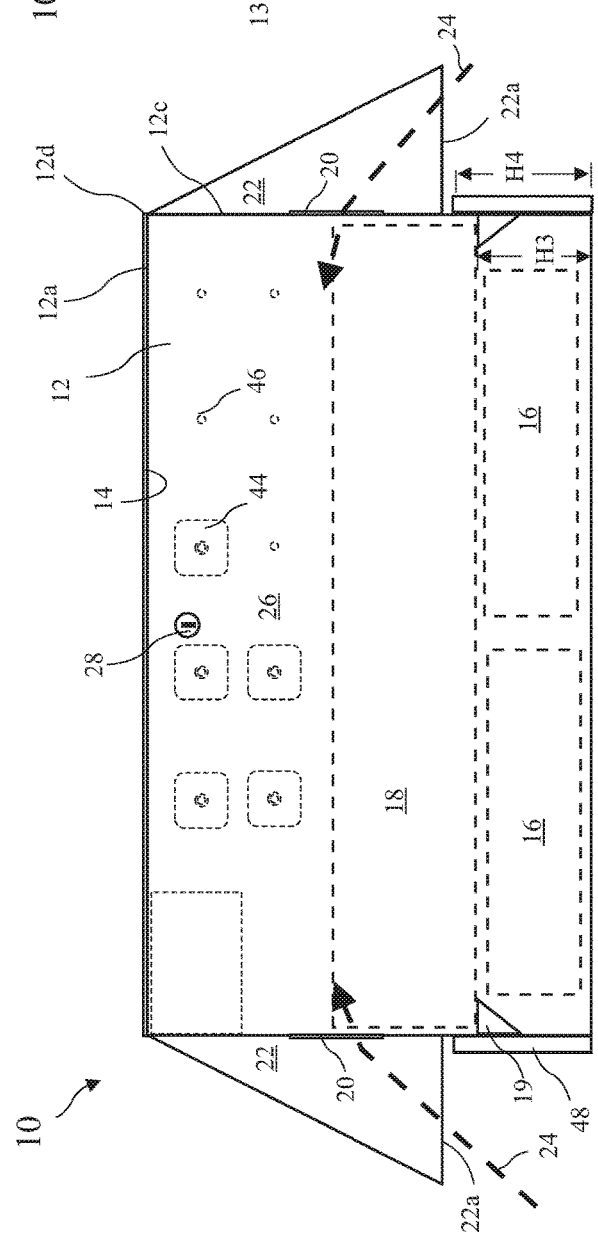
FIG. 1A is a front view of a bait station according to the present invention.

A front view of a bait station 10 according to the present invention is shown in FIG. 1A, a top view of the bait station 10 is shown in FIG. 1B, and a side view of the bait station 10 is shown in FIG. 1C. The bait station 10 has a center housing 12 and contamination guards 22 on each end 12c of the center housing 12 covering rodent entrances 20. The contamination guards 22 prevent or reduce entry of water, dust, leaves and non-target animals into the bait station 10. The contamination guards 22 taper out and down from a top edge 12d of the housing 12 and are open at their bottoms 22a. Posts 48 are attached generally centered to the ends of the housing 12 below the entrances 20. A front 13 is preferably openable or removable to access an interior 26 of the bait station 10, and may be lockable by a tubular cam lock 28. Thermal insulation 14 extends the length and width of the top of the housing 12 to reduce heat entering the bait station 10. Weights 16 rest in the bottom of the housing 12, preferably common bricks. Bait blocks 44 are held by block rods 46 in a top portion of the interior 26 reaching generally horizontally out from a back surface 12b of the housing 12. A tray 18 resides in the interior 26 supported by tray supports 19 having top support surfaces 19a. The tray 18 is preferably white to allow easy identification of rodent droppings.

The housing 12 and contamination guards 22 are preferably waterproof or water resistant material. The housing 12 has a height H1, a length L1, and a width W1. The height H1 is preferably about ten inches, the width W1 is preferably about four inches, and the length L1 is preferably about 18 inches. The contamination guards 22 have a height H2 of preferably about 6.75 inches. The tray supports reach a height H3 of preferably about 2.25 inches. The rodent entrance 20 has a diameter D of about 2.25 inches. The posts 48 have a height H4 of preferably about three inches. The weights 16 are preferably about eight inches long by four inches wide by 2.25 inches high.

A cross-sectional view of the bait station 10 taken along line 2-2 of FIG. 1B is shown in FIG. 2 and a cross-sectional view of the bait station 10 taken along line 3-3 of FIG. 2 is shown in FIG. 3. The bait station 10 may include a circuit 30 having a battery 31 (preferably a common 9 volt battery) and an LED momentary switch 32. The switch 32 is actuated to light an LED in the switch to show that the battery 31 contains a charge. The circuit 30 is connected to radially spaced apart copper foil conductors 36*a* and 36*b* surrounding an entrance 20 by leads 34. A gap 38 separated the copper foil conductors 36*a* and 36*b*. The voltage on the copper foil conductors 36*a* and 36*b* prevents entry of slugs and snails into the housing 12. The housing 12 includes a top 12*a*, right side 12*b*, and left side 12*c* a rear 12*d*, and a bottom 12*e*.

Figure 4:
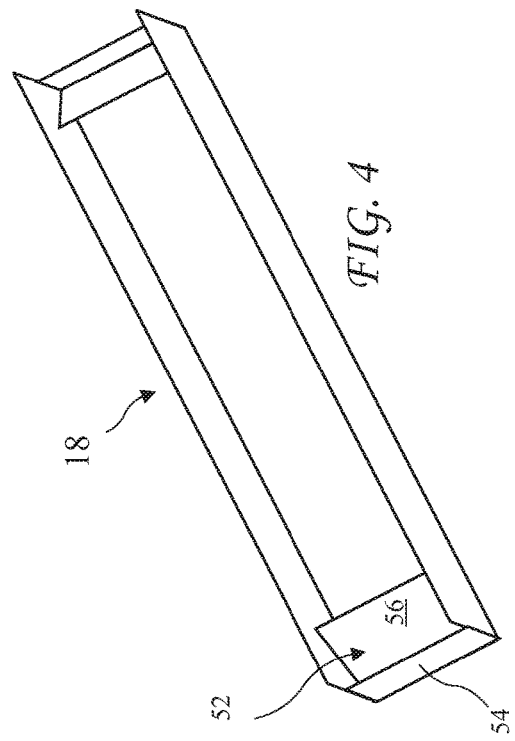
FIG. 4 is a three dimensional view of a bait station tray according to the present invention.
Figure 5B:
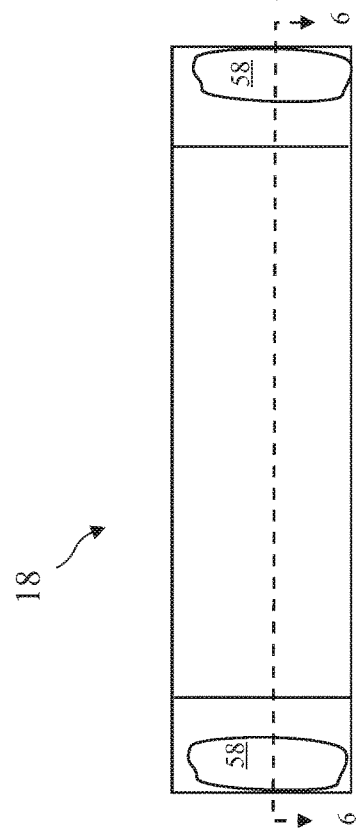
FIG. 5B is a top view of the bait station tray according to the present invention.
Figure 5A:
FIG. 5A is a front view of the bait station tray according to the present invention.
Figure 5C:
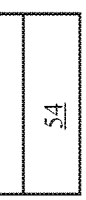
FIG. 5C is a side view of the bait station tray according to the present invention.
Figure 6:
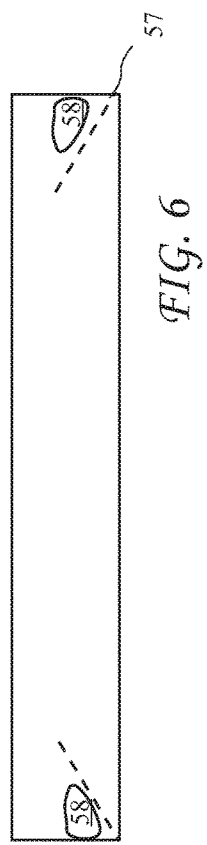
FIG. 6 is a cross-sectional view of the bait station tray according to the present invention taken along line 6-6 of FIG. 5B.

A three dimensional view of the bait station tray 18 is shown in FIG. 4, a front view of the bait station tray 18 is shown in FIG. 5A, a top view of the bait station tray 18 is shown in FIG. 5B, a side view of the bait station tray 18 is shown in FIG. 5C, and a cross-sectional view of the bait station tray 18 taken along line 6-6 of FIG. 5B is shown in FIG. 6. The tray 18 is about 18 inches long, four inches wide, and three inches high. The tray 18 alternatively has length and width to fit inside the housing 12 either touching or nearly touching interior sides and ends of the housing 12. Vertical tray end walls 54 at ends of the tray 18 reach up about to the lowest point of the entrances 20 (see FIG. 3). Diagonal interior walls 56 reach from bottom outside corners 57 of the tray 18 upward and inward and form insecticide troughs 52 holding insecticide 58. The insecticide kills crickets, earwigs, centipedes, millipedes, and the like which might enter the bait station 10 and reduce the number of rodents entering the bait station 10. The tray 18 further includes a tray bottom 60.

While the invention herein disclosed has been described by means of specific embodiments and applications thereof, numerous modifications and variations could be made thereto by those skilled in the art without departing from the scope of the invention set forth in the claims.

I claim:

1. An anti-contamination rodent bait station, comprising:
   a housing having:
      a bottom configured to reside on a horizontal surface;
      a top opposite to the bottom;
      a right side reaching up from the bottom to the top and attaching the top to the bottom;
      a left side reaching up from the bottom to the top and attaching the top to the bottom;
      a rear reaching up from the bottom to the top and attaching the top to the bottom;
      a front either openable or removable to access an interior having boundaries defined by the bottom, the top, the right side, the left side, the rear, and the front;
      a bottom portion of the interior configured to contain at least one weight;
      a center portion of the interior above the bottom portion;
      a top portion of the interior above the center portion and configured to contain bait blocks, the bait blocks residing above the center portion; and
      at least one rodent entrance in at least one of the right side and the left side of the housing, the at least one rodent entrance overlapping the top portion of the interior;
   a removable open top tray residing within the interior of the housing in the center portion, and the tray being removable from the housing through the front without disturbing the bottom, right side, the left side, the rear or the top of the housing.

2. The anti-contamination rodent bait station of claim 1, further including tray supports having top support surfaces for supporting the tray.

3. The anti-contamination rodent bait station of claim 2, wherein the top support surfaces are at or above the bottom portion of the interior.

4. The anti-contamination rodent bait station of claim 3, wherein the bottom portion of the interior is configured to locate the at least one weight below a bottom of the tray.

5. The anti-contamination rodent bait station of claim 4, wherein the at least one weight comprises two common size bricks.

6. The anti-contamination rodent bait station of claim 1, wherein the tray includes at least one generally vertical end wall vertically overlapping the at least one rodent entrance.

7. The anti-contamination rodent bait station of claim 6, wherein the tray includes at least one interior wall proximal to the end wall providing an insecticide trough.

8. The anti-contamination rodent bait station of claim 7, wherein the at least one interior wall is diagonal and reaches upward and inward from a bottom corner of the tray.

9. The anti-contamination rodent bait station of claim 1, further including insulation against a housing top.

10. The anti-contamination rodent bait station of claim 1, further including block rods reaching generally horizontally into the interior from the rear of the housing when the bottom of the housing resides on a horizontal surface, the block rods configured to hold bait blocks.

11. The anti-contamination rodent bait station of claim 1, further including at least one contamination guard residing over the at least one rodent entrance, the contamination guard reaching down and out from a top edge of the housing above the opening.

12. The anti-contamination rodent bait station of claim 11, wherein the at least one contamination guard reaches down below the rodent entrance.

13. The anti-contamination rodent bait station of claim 1, further including:
   a circuit having an electrical source; and
   two spaced apart portions of electrically conductive material around the rodent entrance and electrically connected to the circuit.

14. The anti-contamination rodent bait station of claim 13, wherein the circuit includes a battery and a switch.

15. The anti-contamination rodent bait station of claim 14, wherein:
   the battery is a 9 volt battery; and
   the switch is a momentary rocker switch configured to check the battery.

16. The anti-contamination rodent bait station of claim 1, posts attached to at least one end of the housing generally laterally centered and under the rodent entrance.

17. An anti-contamination rodent bait station, comprising:
   a housing having:
      a fixed top opposite to a fixed bottom;

the fixed bottom configured to reside on a horizontal surface;
a fixed right side reaching up from the bottom to the top and attaching the top to the bottom;
a fixed left side reaching up from the bottom to the top and attaching the top to the bottom;
a rear reaching up from the bottom to the top and attaching the top to the bottom;
a front either openable or removable to access an interior having boundaries defined by the bottom, the top, the right side, the left side, the rear, and the front;
a bottom portion of the interior configured to contain two common bricks residing end to end;
  a center portion of the interior above the bottom portion;
  a top portion of the interior above the center portion and configured to contain bait blocks;
  insulation against the housing top;
  two rodent entrances at opposite ends of the housing at least partially overlapping the top portion of the interior;
  block rods reaching generally horizontally into the interior from a back interior surface of the housing, the block rods configured to hold bait blocks;
  tray supports having top support surfaces above the bottom portion; and
the each contamination guard reaching down and out from a top edge of the housing above each rodent entrance, each contamination guard reaches down below each rodent entrance;
an open top tray residing in the center portion supported by the tray supports between the bottom, the right side, the left side, the rear and below the top, and removable from the housing through the front without disturbing the bottom, right side, the left side, the rear or the top of the housing, the tray simultaneously touching opposite interior ends of the housing, the tray including:
  vertical tray end walls at ends of the tray;
  diagonal interior walls proximal to the tray end wall and reaching upward and inward from a bottom corner of the tray, the diagonal interior walls providing insecticide troughs between the tray end walls and the diagonal interior walls; and
posts attached to at least one end of the housing generally laterally centered and under each rodent entrance.

18. An anti-contamination rodent bait station, comprising:
a housing having:
a bottom configured to reside on a horizontal surface;
a top opposite to the bottom;
a right side reaching up from the bottom to the top and attaching the top to the bottom;
a left side reaching up from the bottom to the top and attaching the top to the bottom;
a rear reaching up from the bottom to the top and attaching the top to the bottom;
a front either openable or removable to access an interior having boundaries defined by the bottom, the top, the right side, the left side, the rear, and the front;
a bottom portion of the interior configured to contain two common bricks residing end to end;
  a center portion of the interior above the bottom portion;
  a top portion of the interior above the center portion and configured to contain bait blocks;
  insulation against the housing top;
  two rodent entrances at opposite ends of the housing at least partially overlapping the top portion of the interior;
  block rods reaching generally horizontally into the interior from a back interior surface of the housing, the block rods configured to hold bait blocks;
  tray supports having top support surfaces above the bottom portion; and
each contamination guard reaching down and out from a top edge of the housing above each rodent entrance, each contamination guard reaches down below each rodent entrance;
an open top tray residing in the center portion supported by the tray supports between the bottom, the right side, the left side, the rear and below the top, and removable from the housing through the front without disturbing the bottom, right side, the left side, the rear or the top of the housing, the tray simultaneously touching opposite interior ends of the housing, the tray including:
  vertical tray end walls at ends of the tray;
  diagonal interior walls proximal to the tray end wall and reaching upward and inward from a bottom corner of the tray, the diagonal interior walls providing insecticide troughs between the tray end walls and the diagonal interior walls;
insecticide residing in the insecticide troughs;
bait blocks residing on the block rods;
posts attached to at least one end of the housing generally laterally centered and under each rodent entrance;
a circuit including a 9 volt battery and a momentary switch, the switch turned to ON when the front in closed;
two spaced apart portions of electrically conducting copper foil around each rodent entrance and electrically connected to the circuit.

* * * * *